Jan. 23, 1968  D. H. BAKER  3,365,636

BRUSHLESS ELECTRIC MOTOR CIRCUIT

Filed Dec. 17, 1964

INVENTOR.
DANIEL H. BAKER
BY Ely, Holrick & Flynn
ATT'YS.

United States Patent Office 3,365,636
Patented Jan. 23, 1968

3,365,636
BRUSHLESS ELECTRIC MOTOR CIRCUIT
Daniel H. Baker, Erie, Pa., assignor to Ametek, Inc.,
New York, N.Y., a corporation of Delaware
Filed Dec. 17, 1964, Ser. No. 424,162
8 Claims. (Cl. 318—138)

ABSTRACT OF THE DISCLOSURE

An electric motor having: on the stator a main winding comprising two halves in series with respective common-cathode connected SCR's between direct current leads from an associated half-wave diode rectifier (adapting the motor to operation from A.C. or D.C. sources) to be alternately energized by direct current for producing a rotor-driving alternating magnetic field, a starting winding in series with a phase-shift capacitor across the SCR anodes, a feedback winding electromagnetically coupled with the main winding, the main winding and SCR's forming a parallel capacitor type inverter circuit having the feedback winding and an inductor and a capacitor as a resonant gating branch in series between the SCR gates and respective shunting diodes with anodes on the negative leads to respective SCR cathodes, and a starting triggering circuit to apply an effective timely gating pulse, after required operating voltage is applied to the inverter circuit, to one of the SCR's thereby initially to fire one particular SCR and to prevent simultaneous conduction of the inverter SCR's; three forms of triggering circuit being disclosed, all energized upon application of power to the motor, as follows:

Figure 1:
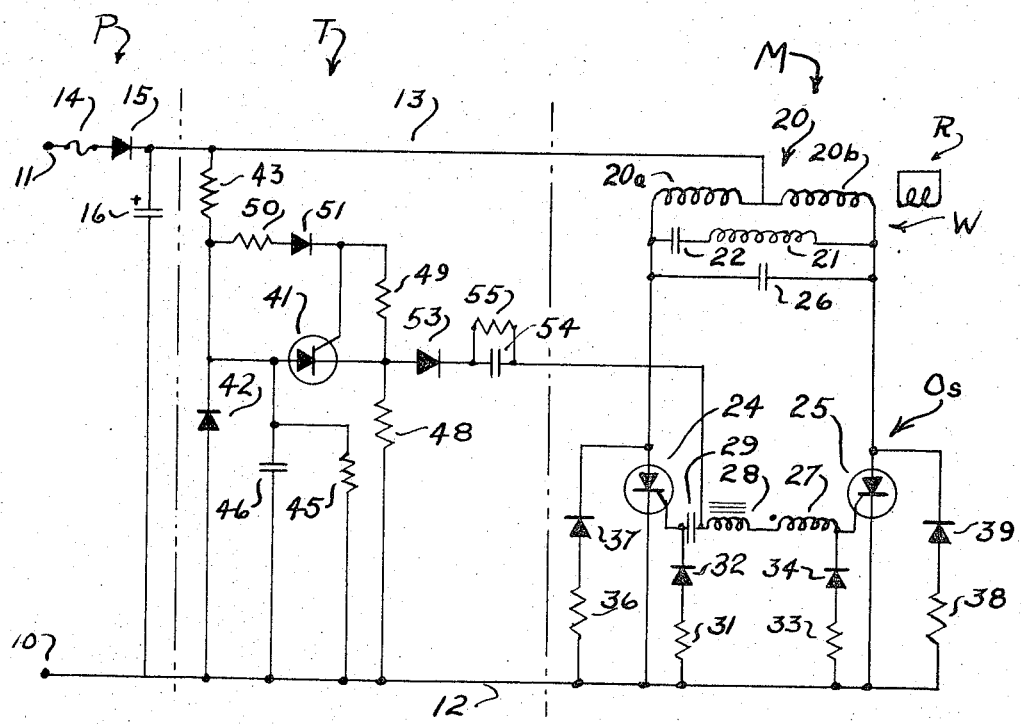

(a) In a *first form*, a third trigger SCR with anode and cathode connected respectively by a limiting resistor and cathode load resistor between the positive and ground leads; a first diode between the limiting resistor and trigger SCR gate and a resistor between the gate and cathode forming a voltage divider keeping the trigger SCR cathode and gate respectively above ground; a blocking diode in series with a discharge resistor-shunted isolating and differentiating capacitor between the trigger SCR cathode and a point in the inverter feedback branch intermediate the feedback capacitor and inductor; and a discharge-resistor-shunted delay timing capacitor between ground and the trigger SCR anode, whereby the trigger SCR anode is held initially at ground upon power application and the SCR non-conducting until the timing capacitor by a power turn-on switching transient is charged sufficiently above the trigger cathode potential to fire and thereby to produce across the load resistor a delayed gating pulse applied preferentially through the feedback circuit capacitor to fire its associated inverter SCR;

(b) The *second form*, similar to the first with an inductor and capacitor in series from a point between the limiting resistor and ground as a rectifier filter network, but with the delay timing capacitor connected from ground to a point between the said first diode and limiting resistor whereby the gate is initially held at ground potential and application of a trigger SCR gating voltage delayed until the timing capacitor rises thereto upon charging, the timing capacitor discharge path provided by the said first diode-gate-cathode resistor and cathode load resistor;

(c) In the *third form*, a uni-junction transistor, connected by base-one and base-two resistors respectively to the ground and positive D.C. leads, an emitter resistor, blocking diode and discharge-resistor-shunted timing capacitor in series from the positive to ground lead with emitter connected to a point between emitter resistor and diode, as a relaxation type oscillator circuit providing timed pulses across the base-one applied to the inverter feedback circuit at a frequency determined by the time constant of the timing capacitor and discharge resistor R-C network, whereby pulses are applied to the said one inverter SCR gate until full inverter operating potential is applied, and a third SCR connected with anode to the emitter, cathode to ground and gate to one end of the motor feedback winding coil to fire upon development of a feedback potential by inverter operation and ground the emitter to stop trigger circuit oscillation.

The present invention is generally concerned with a brushless electric motor, and more particularly with circuitry for a motor having basically mechanical and electromagnetic design requiring the equivalent of alternating current energization which is provided by inverter type oscillator circuitry including windings in the motor electromagnetic structure and solid state switching devices such as silicon controlled rectifiers, whereby the motor is adapted to operation from a direct current supply. Specifically the invention is directed to provision of a trigger circuit to insure alternate firing or switching action of such switching means at all times and especially to obviate locking-up, i.e. simultaneous firing or stable simultaneous conduction of the switching devices especially upon power application to the motor.

In recent years there have been various proposals in the patented and other published prior art for and some degree of commercial use of electric motors which, as far as the electromagnetic relation and function between a stator and rotor is concerned, may be considered to be in principal alternating current motors, for example, induction type motors with squirrel-cage rotors, and which are adapted for operation from direct current sources by incorporating solid state switching devices in oscillator circuitry energizing a main motor winding, the switching devices being alternatingly fired or rendered conductive and non-conductive by pulses or energy applied thereto from a feedback circuit or winding incorporated in the motor electromagnetic structure.

With the still later development of solid state devices capable of handling larger voltages, currents, and therefore power, brushless motors of this character have become of increasing commercial interest since operable on direct current supplies while avoiding brush type commutation hitherto characteristic of direct current motors. In certain environments brush type commutation has been undesirable or unrealiable, for example on one hand because of the arcing or sparkling always in some degree thereby entailed, radio interference, brush wear and maintenance required, or because of faulty commutation which may result under particular environmental conditions of low atmospheric pressure.

Particularly with silicon controlled rectifiers used as the solid state devices for switching oscillator circuitry, especially where there is rapid on-off-on operation of the motor, or where a brushless motor of this type includes a rectifier permitting energization from AC and DC lines, it has been found that there is a small but definite probability over a period of time that both switching devices will fire or conduct simultaneously and remain in a simultaneously conducting state with the untoward results that the motor does not start or resume driving, or that some part of the circuitry may be damaged in consequence of heavy current loads.

To cause firing of one of the SCRs for motor starting, an AC wave or a transient arising upon initial closing of a main power switch and applied to the gate circuitry has been used, the difference within manufacturing tolerances for the individual SCRs of the same type generally being depended upon to cause one rather than both to fire. In the prior arrangements, where a transient originating by power switch closing was used, though of sufficient amplitude to cause proper firing of but one SCR, it could occur before sufficient voltage was applied to the motor inverter circuitry for firing to result; or where an AC wave from the line was used, double firing could occur when the switch was closed at a point in the AC cycle with a voltage too low to cause immediate firing, but with subsequent firing of both SCRs caused by an ensuing voltage rising in the cycle relatively too slowly to cause an effective application to fire one rather than the other SCR.

To eliminate the danger of damage from double firing, various types of auxiliary circuitry have been proposed including relay means responsive to a simultaneous firing condition for causing deenergization of one or both of such switching devices and providing the motor an opportunity for a new energization without simultaneous firing. Such means however have entailed not only the expense of additional components, but also a much larger space requirement resulting usually in separate control boxes for housing auxiliary circuitry. The advantage of attaining proper firing of the switching devices without resort to such expedients is obvious.

A primary object of the present invention is provision of circuitry which will insure that, as energy is applied to the brushless motor circuitry with the motor at a standstill or coasting, only one of the solid state devices, such as silicon controlled rectifiers, will fire. A further object is the provision of circuitry which eliminates double firing of such devices where the motor is energized due to AC components in the line. Basically, this is achieved by including what may be called a trigger circuit so related to and supplying a sufficient and timely pulse to the essential direct current brushless motor circuitry that only one at a time of the switching devices of the latter can and will be fired by such pulse. The trigger circuit isolates the gate or line circuitry of the inverter section from the line to prevent line transients from causing improper firing, and also ensures supplying of a firing pulse for the starting at a time when applied motor energizing voltage has risen to a proper and sufficient value.

Another more specific object is then provision of means without relays for avoiding a possibly damaging simultaneous conduction of the switching devices in a motor of the described character.

A further object is the provision of means for ensuring proper starting in motors of the character described insofar as possibility of simultaneous firing of solid state switching devices is concerned, which means minimizes the space requirement of components in contrast with arrangements incorporating relays for like purpose.

Figure 2:
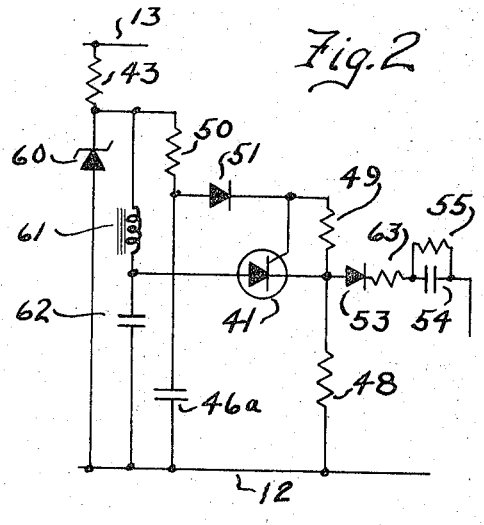
Figure 3:
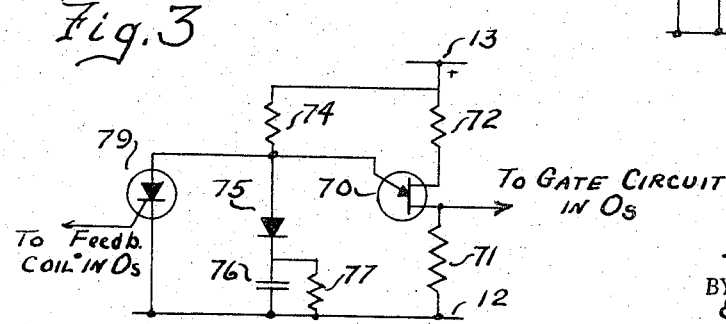

Other objects and advantages will appear from the following description given in relation to the accompanying drawings, wherein:

FIG. 1 is a schematic electrical diagram of the overall circuitry involved for one embodiment of the invention;
FIG. 2 is a modification of FIG. 1; and
FIG. 3 is a still further modification of the invention.

Since for some applications or particular products it has also been found desirable that a motor of the so-called direct current brushless type be adapted to "universal" operation, the invention is disclosed as embodied in overall circuitry including a half-wave rectifier.

In FIG. 1 of the drawing, for convenience of description certain sections of circuitry are delimited by dash-dot outlines and designated as a DC power supply section P, a trigger circuit T, and the brushless direct current motor characteristic circuitry M including the principal motor winding circuitry located mainly at W and the multivibrator type oscillator switching or inverter circuitry Os. The trigger circuit supplies an anti-lockup firing pulse to the gate circuit in the oscillator. The power supply section P interposed between the power input terminals 10, 11 and output lines 12, 13 as DC input lines to the motor is shown as including a fuse 14 and half-wave diode rectifier 15 in series between input terminal 11 and a line 13 with filter capacitor 16 across the output lines, ground line 12 coming directly from the input terminal 10.

Typical values are hereinafter given for a nominally rated 1/3 horsepower motor operating from 115 volts AC or DC applied at terminals 10, 11, having a 36 slot four-pole stator of a nominal 3¼" outside diameter and about one inch length cooperating with a 46 slot or bar rotor of corresponding length and 2.1" outside diameter, and considered to have a tolerance of plus or minus 20%, the motor being actually rated at 90 volts.

In the motor winding portion, or cooperation with a suitable rotor R such as a squirrel-cage type rotor, on the stator there are provided a divided main stator winding 20 providing the two halves 20a and 20b to the center of which runs the line 13; a starting winding 21 connected in series with a starting capacitor 22 as a starting branch across the extreme ends of the main winding, and a feedback winding 27. There is a commutating capacitor 26 across the ends of the main winding which in turn are connected to the respective anodes of the silicon controlled rectifiers, SCR's 24 and 25, having cathodes connected directly to line 12.

The feedback winding, comprised of eight turns per pole of 30 gauge wire, is connected in series to a 25 millihenry toroid choke 28 and a 6 mfd. 150 v. capacitor 29 as a resonant feedback branch connected between the gates of the 2N1849 SCR's 24, 25, in a gate circuit in which the SCR gates are connected to line 12 through a respective 1 ohm 3 w. resistor and 1N537 blocking diode in series as at 31, 32 and 33, 34 respectively; these and the other component values hereinafter given being, of course, merely illustrative.

In this type of motor, the inverter or switching frequency is normally substantially independent of the rotor speed; and, by varying the tuning of the feedback branch or gate circuit, as by changing the total inductance of the gate circuit or its capacitor 29, normal motor operating speed may be changed. Thus by merely varying capacitor 29 there was readily obtained a 50% speed change for the motor here in question.

The SCR anodes are also each connected to ground by a resistor and diode as at 36, 37 and 38, 39; these diode connections being used to protect the SCR's and also especially those to the gate to reduce the voltage to which the commutating capacitor 26 may be subjected.

In the trigger circuit T, the anode of the 2N2322 SCR 41 is connected between a 1N537 diode 42 and 7.5K ohm resistor 43 in series across lines 12–13, and also through the parallel 680 ohm resistor 45 and 10 mfd. 25 v. capacitor 46 as an R-C branch to line 12. The backward drop of diode 42 renders it equivalent to a very high value resistor or a Zener diode provided at low cost. The SCR cathode here is connected by a 250 ohm resistor 48 to line 12 and by a 220 ohm resistor 49 to the gate, while the 2K ohm resistor 50 and 1N537 diode 51 are connected in series to the gate from the anode, therefore here, from the point between diode 42 and resistor 43. The output of the section T to the gate circuit in Os is taken from the cathode of 41 through the 1N537 diode 53 in series with the paralleled 22K ohm resistor and 0.033 mfd. 200 v. capacitors 54, 55 to a point in the feedback or gate branch, here shown between choke 28 and capacitor 29.

In the basic motor circuitry of this kind, once a motor circuit SCR conducts, say 24, with current flow in winding 20a, the commutating capacitor 26 charges; and thereafter a pulse generated by induction in the feed back winding 27 of appropriate polarity fires the other SCR 25. The commutating capacitor immediately discharges, turning off the first conducting SCR and then charges in the opposite sense and so on repeatedly; the alternating pulsing by the feedback circuit being, of course, determined in frequency by the component values tuning the latter.

With the circuit of FIG. 1, when AC power is switched onto 10, 11 and the DC output of the capacitor filtered half-wave rectifier section P is applied to the motor section M, firing of the SCR's 24, 25 is to be delayed, and therefore the application of the trigger pulse, until the appropriate full voltage is present on the motor inverter circuit. Therefore, the trigger circuit is adapted to delay appropriately the trigger pulse generation until that voltage is present so that firing will occur with certainty.

With the rising transient voltage, which is the initial output of section P, upon switch closing, the capacitor 46 is seen as a short circuit so that the anode in SCR 41 is substantially at the ground potential of line 12. However, the network 50, 51, 49, 48 provides at the top of 48 a positive potential or reverse cathode-anode voltage ensuring that the trigger circuit SCR 41 does not conduct despite a positive gate voltage at the top of resistor 49. The delay capacitor 46 charges through the current limiting resistor 43, raising the trigger SCR anode potential until the latter fires. This develops a potential across 48 resulting initially in a transient pulse, which is applied, through blocking diode 53 and capacitor 54 as a differentiating and isolating capacitor, as a sharply peaked positive-going trigger pulse to the feedback or gate circuit of the oscillator Os at the point indicated between capacitor 29 and inductor 28. Hence the SCR 24 must fire, since the pulse is applied through capacitor 29 to the SCR 24 gate, being delayed or blocked from the SCR 25 gate by inductance of 28, 27. The amplitude and width of the applied pulse are thus controllable and controlled to appropriate values.

The resistors 45 and 55, provided for rapid discharge of their associated capacitors, adapt the overall circuitry to rapidly repeated on-off-on switching of the motor. As the SCR 41, once fired, remains conducting, the capacitor 54 and resistor 55 isolate the feedback circuit from the DC voltage across 48 and also in conjunction with blocking diode 53 isolate the feedback circuit from the AC line so that line AC pulses cannot cause firing.

In the trigger circuit modification of FIG. 2 (wherein components analogous to those of FIG. 1 are designated by similar numerals and have similar values unless otherwise stated), a 1N2988 Zener diode 60 is connected in series between resistors 43, 50 and ground to clip to about 27 volts the input to the further filter network comprised of the 50 mh. inductor 61 and 5 mfd. capacitor 62, for applying filtered DC to the anode of a 2N1776 SCR 41 connected therebetween. However, a 150 mfd. capacitor 46a is connected from ground to the point between resistor 50 and 1N677 blocking diode 51, a 2K ohm resistor 49 is used; and also a 250 ohm dropping resistor 63 between the 1N677 blocking diode 53 and capacitor 54. Diode 51 and resistors 49, 48 provide the discharge path for 46a.

Here, when power is turned on, though the rising voltage is applied to the anode of SCR 41, again the delay capacitor 46a is seen as substantially a short circuit, and the gate is at approximately ground potential with the result that the trigger circuit SCR 41 cannot fire until 46a is sufficiently charged giving time for the voltage applied to the motor circuit proper to reach operating value. Upon firing of 41, again a transient pulse developed across resistor 48 is applied through 53, 63 and 54 to the gate circuit of the motor inverter circuitry as a sharply peaked triggering pulse for the latter. Here again the trigger circuit isolates the gate circuitry of SCR's 24, 25 from the line; and also, after the voltage applied to the motor circuitry proper is at apppropriate value, supplies a suitable firing impulse.

In the modification of FIG. 3, the unijunction transistor 70, with base-one resistor 71 connected to ground 12 and base-two resistor 72 to the motor D.C. supply line 13, has its emitter connected between the resistor 74 and blocking diode 75 which with paralleled capacitor 76 and resistor 77 likewise form a series branch between 13 and 12, providing what is essentially a relaxation type oscillator circuit, developing an output across resistor 71 applied through line 78 to the gate circuit for SCR's 24, 25 as in FIGS. 1 or 2. Also the SCR 79 has its anode connected to the emitter of UJT 70, its cathode to ground and its gate to the feedback coil of the motor circuitry as at a point between 28 and 29.

When the power for the motor is turned on, output pulses, developed across resistor 71 at a frequency established by the RC network 76-77, are applied to the gate circuit of SCR's 24, 25 as in the previously described circuits.

The first of these pulses occurring after the voltage has reached a sufficient level on the anodes of SCR's 24, 25 causes 24 to fire whereupon its anode-cathode voltage drops substantially to zero, while the voltage across the anode and cathode of 25 is then relatively at its highest value and needs only a small change in its gate for firing. Thus the next pulse from the UJT circuit fires 25, which causes 24 to turn off even though no sufficient feedback is developed in 27 for normal inverter action. The firing alternately thus continues under the control of the trigger circuit until a sufficient feedback voltage is developed at coil 27 to take over inverter action, which also applied to the gate of SCR 79 turns the latter on, thus effectively grounding the emitter of UJT 70 to stop the oscillation in this circuit. The frequency of this oscillator may be chosen to be quite different from the designed frequency of the motor for achieving desired starting characteristics and controlled starting.

The circuit of FIG. 3 also isolates the motor SCR gate circuitry from line AC, and by the repeated pulses supplied, will ensure a triggering after the voltage onto the motor windings has reached a sufficient level to cause SCR firing appropriately in the motor inverter.

I claim:

1. The combination, with a brushless electric motor comprised of a rotor, a stator with main and feedback windings, said rotor and stator with main windings forming a motor adapted to operate upon alternating energization of the main windings, and two solid-state bi-stable switching devices forming with the feed-back winding in a control circuit for said devices and with the main winding a multivibrator type inverter for providing from a direct current input an alternating energization to the main windings, of a trigger circuit energized from said input and adapted to supply through said control circuit a single peaked switching pulse to a predetermined one of said devices; said control circuit including an inductor as a high impedance to said pulse preventing application to the other device; said trigger circuit including a third switch device in series with a load resistor across said direct current input and a peaking network for shaping and applying to said control circuit a pulse arising across said load resistor upon initial switching of the third device to on condition, and further including a timing network applying an on-switching potential derived from said input to the said third switch device with a delay allowing application from said input of proper operating potential to said inverter after operating voltage is applied to said inverter from said direct current input.

2. The combination, with a brushless electric motor adapted to operation from direct current supply lines, and including a rotor, a stator, and for alternating magnetization of said stator a parallel SCR oscillator type inverter comprised of main motor and feedback windings on the stator, a pair of SCR's and a gate circuit including a capacitor in a series with said feedback winding between the SCR gates; of a trigger circuit to fire one of said SCR's to begin inverter action on application of DC power to said inverter; said trigger circuit comprising a bi-stable solid state device having a controlled electrode connected to a load resistor, said device and load resistor being connected in series across direct curent input lines of said inverter, a capacitor and resistor connected as a series branch across said lines, the load resistor and said capaictor being connected to the same line, a point between said capacitor and the second said resistor being connected to another electrode of said device, application of direct current power to said lines charging said capacitor to a voltage sufficient to turn on said device and develop a pulsed output across the load resistor, and means for applying the said output to a point between said feedback winding and capacitor of the inverter, whereby an SCR firing pulse is supplied to said gate circuit after the voltage applied to said inverter has attained inverter operating level.

3. A brushless electric motor adapted to operation from direct current supply lines comprised of:

a stator and associated rotor; an oscillator type inverter including a pair of SCR's, a divided main winding on the stator having two winding sections each in an anode circuit between a respective SCR and a first direct current input line, a feedback winding on the stator and connected in a gate circuit between the said SCR's, said gate circuit including blocking diodes connected between a second direct current input line as a ground and respective SCR gates with diode cathodes to the gates, the SCR cathodes commonly connected to ground; a commutating capacitor between the SCR anodes; said rotor being driven upon alternating energization of said main winding sections by inverter operation at a speed determined by the resonance frequency of said gate circuit;

a trigger circuit to ensure starting of the motor with avoidance of double firing of said SCR's, comprising means energized from said direct current lines upon closure of a line power controlling switch to apply to one gate of said SCR's a pulse delayed to allow operating voltage to be applied to said inverter, said pulse having a leading edge sharply rising to a voltage sufficient to fire said one SCR, said trigger circuit isolating said gate circuit from the said first input line.

4. A motor as described in claim 3, wherein said gate circuit includes a capacitor in series with said feedback winding and said pulse is applied at the feedback winding side of the last said capacitor.

5. A motor described in claim 3, said trigger circuit comprising a third SCR with a cathode connected through a load resistor to ground and to said one gate through a capacitor shunted by a discharge resistor, dropping resistor means connected to said first input line and through a blocking diode to the third SCR gate, a resistor between gate and cathode, means energized from said first line for applying a potential to the third SCR anode, and means including a delay capacitor charging through said dropping resistor means to cause delayed firing of the said third SCR at an interval determined by the capacitor charging after closure of said switch.

6. A motor as described in claim 5, said delay capacitor connected between ground and the third SCR anode and shunted by a discharge resistor, whereby delay capacitor control of the potential on the third SCR anode determines its firing.

7. A motor as described in claim 5, said delay capacitor connected between ground and the line side of the blocking diode of the third SCR gate, the third SCR anode potential provided from the direct current input, whereby delay capacitor control of the potential on the third SCR gate controls its firing.

8. A motor as described in claim 3, said trigger circuit comprising a unijunction transistor type relaxation oscillator providing peaked output pulses to the said one gate, whereby the inverter SCR's are initially fired at a frequency determined by said pulses, said oscillator including a resistor-capacitor network between the unijunction transistor emitter and ground, and a resistor in series with said network between said first input line and ground, and a third SCR connected between said emitter and ground to stop the oscillator operation upon firing, and means connecting the third SCR gate to the said feedback winding for causing the third SCR to fire after a sufficient feedback is developed for operation of the inverter independently of the relaxation oscillator, whereby there is assured a said pulse for inverter SCR firing after the voltage applied to said inverter has attained operating level.

References Cited

UNITED STATES PATENTS

| 3,098,958 | 7/1963 | Katz | 318—138 |
| 3,171,072 | 2/1965 | Adair | 318—138 |
| 3,175,167 | 3/1965 | Lloyd | 318—138 XR |
| 3,226,655 | 12/1965 | Wilting. | |
| 3,251,006 | 5/1966 | Mehwald | 321—45 |
| 3,273,076 | 9/1966 | Wilting. | |

FOREIGN PATENTS

| 959,483 | 7/1962 | Great Britain. |

ORIS L. RADER, *Primary Examiner.*

G. R. SIMMONS, *Assistant Examiner.*